(12) United States Patent
Bitauld et al.

(10) Patent No.: US 10,805,011 B2
(45) Date of Patent: Oct. 13, 2020

(54) BELL STATE MEASUREMENT

(71) Applicant: Nokia Technologies Oy, Espoo (FI)

(72) Inventors: David Bitauld, Cambridge (GB); Enrique Martin-Lopez, Cambridge (GB)

(73) Assignee: Nokia Technologies Oy, Espoo (FI)

(*) Notice: Subject to any disclaimer, the term of this patent is extended or adjusted under 35 U.S.C. 154(b) by 188 days.

(21) Appl. No.: 16/084,815

(22) PCT Filed: Mar. 29, 2016

(86) PCT No.: PCT/FI2016/050191
§ 371 (c)(1),
(2) Date: Sep. 13, 2018

(87) PCT Pub. No.: WO2017/168032
PCT Pub. Date: Oct. 5, 2017

(65) Prior Publication Data
US 2019/0074911 A1    Mar. 7, 2019

(51) Int. Cl.
*G02F 1/01* (2006.01)
*H04B 10/70* (2013.01)
*G02F 1/21* (2006.01)
*H04L 9/08* (2006.01)

(52) U.S. Cl.
CPC ............ *H04B 10/70* (2013.01); *G02F 1/21* (2013.01); *H04L 9/0852* (2013.01); *G02F 2001/217* (2013.01)

(58) Field of Classification Search
CPC .......... G02F 1/0147; G02F 1/225; G02F 1/01; G02F 2001/217; G02F 1/21; H04B 10/70
See application file for complete search history.

(56) References Cited

U.S. PATENT DOCUMENTS 7,889,352 B2   2/2011   Madsen
9,020,367 B2   4/2015   Jones et al.
9,077,457 B1   7/2015   Smith et al.
(Continued)

FOREIGN PATENT DOCUMENTS

CN     200989984 Y    12/2007
WO     2013/052903 A1   4/2013
(Continued)

OTHER PUBLICATIONS

Lo et al., "Measurement Device Independent Quantum Key Distribution", Physical Review Letters, vol. 108, No. 13, May 28, 2012, pp. 1-7.
(Continued)

*Primary Examiner* — Jennifer Doan
(74) *Attorney, Agent, or Firm* — Nokia Technologies Oy (57) ABSTRACT

According to an example aspect of the present invention, there is provided an apparatus comprising a first and a second polarization beam splitter-rotator (140, 142), together arranged to split two incoming polarization encoded qubits into four first optical modes, the apparatus being configured to align polarizations of the four first optical modes, an interferometer stage (150) configured to obtain, from the four first optical modes, four second optical modes, and four detectors (160) arranged to receive at least one of the four second optical modes.

20 Claims, 6 Drawing Sheets

(56) References Cited

U.S. PATENT DOCUMENTS

| | | | | |
|---|---|---|---|---|
| 2013/0188971 A1* | 7/2013 | Painchaud | ............ | G02B 6/126 398/214 |
| 2013/0322873 A1* | 12/2013 | Stevenson | ............ | H04B 10/70 398/25 |
| 2014/0369678 A1* | 12/2014 | Yang | ............ | H04B 10/2572 398/26 |
| 2015/0055961 A1* | 2/2015 | Meyers | ............ | H04B 10/70 398/140 |
| 2015/0077821 A1 | 3/2015 | Smith et al. | | |
| 2015/0365230 A1* | 12/2015 | Bovino | ............ | H04L 9/0825 380/256 |

FOREIGN PATENT DOCUMENTS

| | | |
|---|---|---|
| WO | 2015/189456 A1 | 12/2015 |
| WO | 2016/099565 A1 | 6/2016 |
| WO | 2016/170223 A1 | 10/2016 |
| WO | 2016/198728 A1 | 12/2016 |
| WO | 2017/055676 A1 | 4/2017 |

OTHER PUBLICATIONS

Doerr, "Integrated Photonic Platforms for Telecommunications: InP and Si", IEICE Transactions on Electron, vol. E96-C, No. 7, Jul. 2013, pp. 950-957.

Rau et al., "Spatial Mode Side Channels in Free-Space QKD Implementations", IEEE Journal of Selected Topics in Quantum Electronics, vol. 21, No. 3, May-Jun. 2015, 5 pages.

International Search Report and Written Opinion received for corresponding Patent Cooperation Treaty Application No. PCT/FI2016/050191, dated Jul. 20, 2016, 13 pages.

Humble et al., "Spectral Effects in Quantum Teleportation", Physical Review A, vol. 75, Feb. 8, 2007, pp. 1-8.

Extended European Search Report received for corresponding European Patent Application No. 16896657.0, dated Oct. 16, 2019, 8 pages.

* cited by examiner

BELL STATE MEASUREMENT

RELATED APPLICATION

This application was originally filed as PCT Application No. PCT/FI2016/050191 filed Mar. 29, 2016.

FIELD

The present invention relates to quantum cryptography and/or measuring a bell state of polarization encoded qubits.

BACKGROUND

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

Quantum key distribution, QKD, together with private key encryption, or symmetric encryption, can be proved to be a mathematically secure communication method. Secrecy of the distributed private keys can be guaranteed based on laws of physics, as any eavesdropping would be detectable from disturbance it creates in the system.

However, QKD systems suffer from detector side channel attacks, for example. Measurement device independent quantum key distribution, MDI-QKD, is a technique that both traverses the risk of side-channel attacks and increases a secure distance while employing conventional lasers and imperfect detectors. MDI-QKD is based on a partial Bell state measurement of two qubits transmitted by two different emitters.

SUMMARY OF THE INVENTION

The invention is defined by the features of the independent claims. Some specific embodiments are defined in the dependent claims.

According to a first aspect of the present invention, there is provided an apparatus comprising a first and a second polarization beam splitter-rotator, together arranged to split two incoming polarization encoded qubits into four first optical modes, the apparatus being configured to align polarizations of the four first optical modes, an interferometer stage configured to obtain, from the four first optical modes, four second optical modes, and four detectors arranged to receive at least one of the four second optical modes.

Various embodiments of the first aspect may comprise at least one feature from the following bulleted list:
- the first polarization beam splitter-rotator is arranged to receive a first one of the two incoming polarization encoded qubits and split it into two first optical modes, and the second polarization beam splitter-rotator is arranged to receive a second one of the two incoming polarization encoded qubits and split it into two further first optical modes.
- the apparatus further comprises at least one processing core configured to determine, when photons are detected in the four detectors and to determine a Bell state of the incoming two polarization encoded qubits based on when the photons are detected
- the at least one processing core is configured to determine a first Bell state responsive to photons being detected in a first and third one, or a second and fourth one, of the four detectors simultaneously, and the at least one processing core is configured to determine a second Bell state responsive to photons being detected in the first and the second one, or the third and the fourth one, of the four detectors simultaneously
- the at least one processing core is configured to determine, responsive to photon detection in only one of the four detectors, one of the following: a third Bell state, a fourth Bell state, and only one qubit reached the apparatus
- the interferometer stage comprises a double length 4×4 multimode interferometer
- the interferometer stage comprises two 2×2 multimode interferometer elements, each 2×2 multimode interferometer element being arranged to provide its output to no more than two detectors from among the four detectors
- the interferometer stage comprises two 2×2 multimode interferometer elements, each 2×2 multimode interferometer element being arranged to provide its output to at least three detectors from among the four detectors
- the four detectors comprise four superconducting nanowire single photon detectors
- the apparatus is integrated on an integrated photonic chip.

According to a second aspect of the present invention, there is provided a method comprising splitting two incoming polarization encoded qubits into four first optical modes, aligning polarizations of the four first optical modes, obtaining, using an at least one interferometer, from the four first optical modes, four second optical modes, and receiving at least one of the four second optical modes using four detectors.

Various embodiments of the second aspect may comprise at least one feature corresponding to a feature on the preceding bulleted list laid out in connection with the first aspect.

According to a third aspect of the present invention, there is provided an apparatus comprising means for splitting two incoming polarization encoded qubits into four first optical modes, means for aligning polarizations of the four first optical modes, means for obtaining, using an interferometer, from the four first optical modes, four second optical modes, and means for receiving at least one of the four second optical modes using four detectors.

According to a fourth aspect of the present invention, there is provided a non-transitory computer readable medium having stored thereon a set of computer readable instructions that, when executed by at least one processor, cause an apparatus to at least split two incoming polarization encoded qubits into four first optical modes, align polarizations of the four first optical modes, obtaining, using at least one interferometer, from the four first optical modes, four second optical modes, and receive at least one of the four second optical modes using four detectors.

According to a fifth aspect of the present invention, there is provided a computer program configured to cause a method in accordance with the second aspect to be performed.

EMBODIMENTS

The principles of the present invention enable a partial Bell state measurement, suitable for MDI-QKD, using an implementation that can be integrated on an integrated photonic chip. In some embodiments, many receivers are multiplexed in the same chip, saving in any cost of detector refrigeration. A receiver arranged according to the present invention involves performing an interferometric operation on four optical modes, which are polarization aligned, and then determining when resulting optical modes are received, to enable the partial Bell state measurement.

A Bell state is a two-qubit state. In case the qubits are encoded in the polarization of photons, the four possible Bell states can be written as:

$|\Phi-\rangle = 1/\sqrt{2}(|H\rangle_A \otimes |H\rangle_B - |V\rangle_A \otimes |V\rangle_B)$ $|\Phi+\rangle = 1/\sqrt{2}(|H\rangle_A \otimes |H\rangle_B + |V\rangle_A \otimes |V\rangle_B)$ $|\Psi-\rangle = 1/\sqrt{2}(|H\rangle_A \otimes |V\rangle_B - |V\rangle_A \otimes |H\rangle_B)$ $|\Psi+\rangle = 1/\sqrt{2}(|H\rangle_A \otimes |V\rangle_B + |V\rangle_A \otimes |H\rangle_B)$ In the previous equations, $|H\rangle$ and $|V\rangle$ are the quantum states corresponding to the horizontal and vertical polarization of a single photon, while A and B are the two spatial input modes of the two input photons.

A Bell state measurement comprises determining in which of the four Bell states are the two input photons. If the polarization quantum state of the two input photons is separable, that is, not entangled, performing the Bell state measurement projects the two-photon state into an entangled Bell state with a certain probability. The four Bell states above form an algebraic basis of all pure states of two qubits.

Figure 1A:
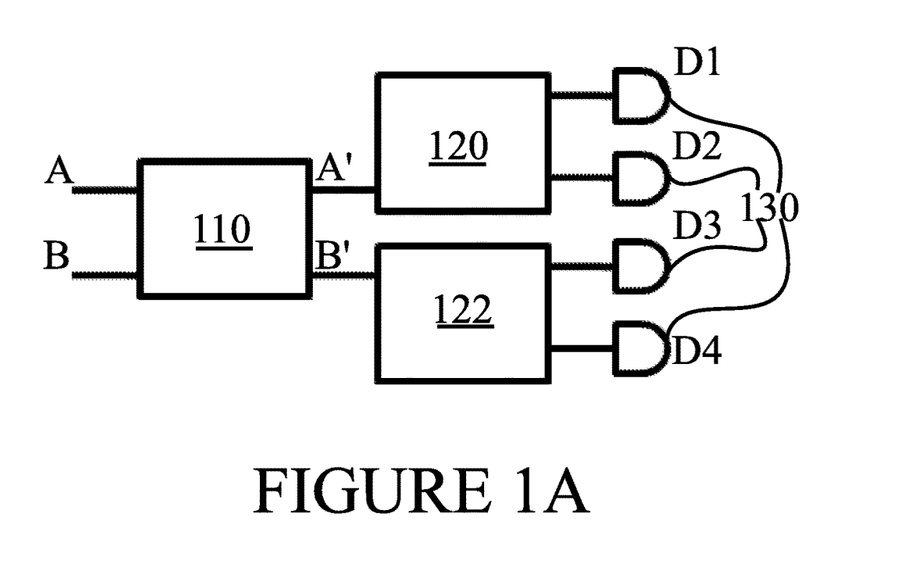
FIGS. 1A and 1B illustrate example systems illustrating Bell state measurements.
Figure 1B:
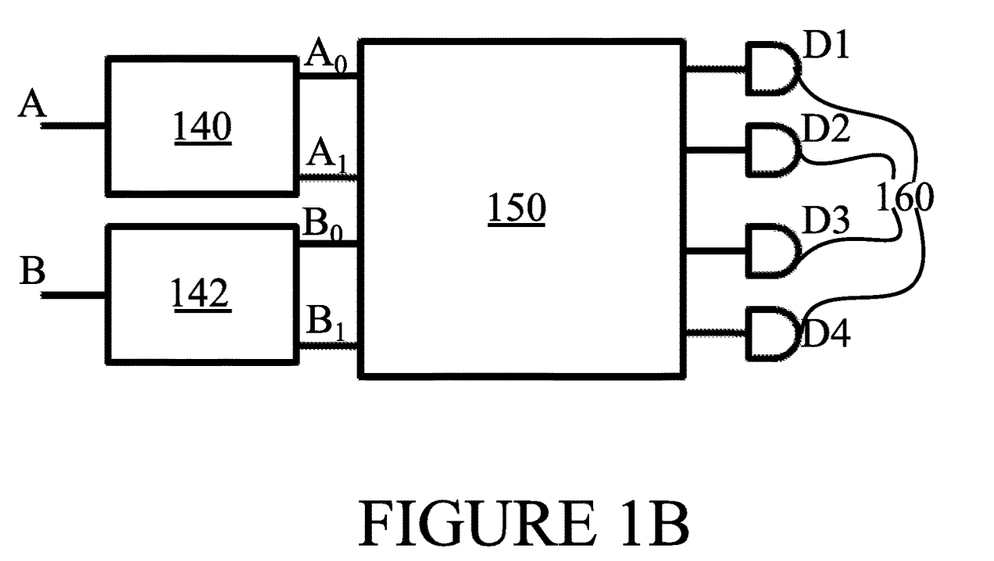

FIGS. 1A and 1B illustrate example systems illustrating Bell state measurements. FIG. 1A illustrates principles of partial Bell state measurements. Polarization-independent beam splitter 110 receives polarized photons A and B, and emits two output modes A' and B', which are fed to polarizing beam splitters 120 and 122. The polarizing beam splitters in turn obtain, from the two modes A' and B' output from beam splitter 100, four output modes which are provided to detectors 130. Detectors 130 are configured to measure arrival times of photons in the modes output from polarizing beam splitters 120 and 122. Detectors 130 may be denoted, from the top to the bottom, as D1, D2, D3 and D4.

A basis of input states may be expressed by creation operators $a^+_{AH}$, $a^+_{AV}$, $a^+_{BH}$, and $a^+_{BV}$, which applied to the vacuum state $|0\rangle$ would result in single photon states corresponding to $|H\rangle A$, $|V\rangle A$, $|H\rangle B$ and $|V\rangle B$ respectively.

Considering a symmetric beam splitter, and $a^+_{A'H} \to a^+_1$, $a^+_{A'V} \to a^+_2$, $a^+_{B'V} \to a^+_3$, $a^+_{B'H} \to a^+_4$, where $a^+_1$, $a^+_2$, $a^+_3$, and $a^+_4$ are the creation operators for the quantum states corresponding to the presence of a photon in the optical modes leading to each of detectors 130, from top to bottom, respectively.

$a^+_{AH} \to 1/\sqrt{2}(a^+_1 + i\, a^+_4)$ $a^+_{AV} \to 1/\sqrt{2}(a^+_2 + i\, a^+_3)$ $a^+_{BV} \to 1/\sqrt{2}(i\, a^+_2 + a^+_3)$ $a^+_{BH} \to 1/\sqrt{2}(i\, a^+_1 + a^+_4)$ Therefore, the output of the arrangement in FIG. 1, for each of the Bell states as an input, is the following:

$|\Phi-\rangle = 1/\sqrt{2}(a^+_{AH} a^+_{BH} - a^+_{AV} a^+_{BV})|0\rangle \to i/2\sqrt{2}(a^+_1 a^+_1 - a^+_2 a^+_2 - a^+_3 a^+_3 + a^+_4 a^+_4)|0\rangle$ $|\Phi+\rangle = 1/\sqrt{2}(a^+_{AH} a^+_{BH} - a^+_{AV} a^+_{BV})|0\rangle \to i/2\sqrt{2}(a^+_1 a^+_1 + a^+_2 a^+_2 + a^+_3 a^+_3 + a^+_4 a^+_4)|0\rangle$ $|\Psi-\rangle = 1/\sqrt{2}(a^+_{AH} a^+_{BV} - a^+_{AV} a^+_{BH})|0\rangle \to 1/\sqrt{2}(a^+_1 a^+_3 - a^+_2 a^+_4)|0\rangle$ $|\Psi+\rangle = 1/\sqrt{2}(a^+_{AH} a^+_{BV} + a^+_{AV} a^+_{BH})|0\rangle \to 1/\sqrt{2}(a^+_1 a^+_2 + a^+_3 a^+_4)|0\rangle$ If photons are detected simultaneously in {D1 and D3} or {D2 and D4}, we know the Bell state was $|\Psi-\rangle$. If on the other hand photons are detected simultaneously in detectors {D1 and D2} or {D3 and D4}, we know the Bell state was $|\Psi+\rangle$.

If photons are detected solely in detector D1 or D2 or D3 or D4, and we assume the detectors are not photon-number-resolving, there are several possibilities. Namely, the Bell state may be $|\Phi-\rangle$, $|\Phi+\rangle$, or then only one photon reached the measurement device.

In general, the expression "partial Bell state measurement" refers to the fact that a measurement as laid out above can only identify two of the four possible Bell states. However, in terms of MDI-QKD, this is sufficient as any detected Bell state enables a security proof to be processed in a MDI-QKD protocol.

Turning then to FIG. 1B, two polarization beam splitter-rotators, PBSR, 140 and 142, are arranged to receive the input qubits A and B. In PBSRs 140 and 142, the light is split according to polarization and at least one of the two respective outputs has its polarization rotated, such that outputs $\{A_0, A_1, B_0, B_1\}$ of the PBSRs have the same polarization. They may thus be considered to be path encoded. The path encoded modes may be considered four first optical modes.

After PBSRs 140 and 142, the path-encoded inputs are conveyed into interferometer 150. Interferometer 150 may comprise a 4×4 multimode interferometer, MMI. Interferometer 150 may be configured to output four second optical modes, obtained in the interferometer from the four first optical modes. The MMI may be implanted as a 4×4 MMI that has twice the length of a usual 4×4 MMI, that is, a 4×4 MMI used as a 90-degree hybrid. A transfer matrix of a single-length MMI is:

$$M = \frac{1}{2}\begin{pmatrix} q & -1 & 1 & q \\ -1 & q & q & 1 \\ 1 & q & q & -1 \\ q & 1 & -1 & q \end{pmatrix}\begin{pmatrix} a_1^+ \\ a_2^+ \\ a_3^+ \\ a_4^+ \end{pmatrix}, \text{ with } q = e^{i\pi/4}$$

The transfer matrix of the double length MMI is the square of the single length one, $M^2$. We use this matrix to calculate the quantum states in the output waveguides leading to detectors D1, D2, D3, and D4.

$$\begin{pmatrix} a_{A0}^+ \\ a_{A1}^+ \\ a_{B0}^+ \\ a_{B1}^+ \end{pmatrix} \rightarrow \frac{e^{i\pi/4}}{\sqrt{2}}\begin{pmatrix} 1 & 0 & 0 & i \\ 0 & 1 & i & 0 \\ 0 & i & 1 & 0 \\ i & 0 & 0 & 1 \end{pmatrix}\begin{pmatrix} a_1^+ \\ a_2^+ \\ a_3^+ \\ a_4^+ \end{pmatrix}$$

This corresponds to the same transfer matrix as in the arrangement of FIG. 1A up to a physically irrelevant global phase. Therefore the Bell states get transformed in the same way, omitting the global phase $e^{(i\pi/4)}$:

$|\Phi-\rangle = 1/\sqrt{2}(a^+_{A0}a^+_{B0} - a^+_{A1}a^+_{B1})|0\rangle \rightarrow i/2\sqrt{2}(a^+_1 a^+_1 - a^+_2 a^+_2 - a^+_3 a^+_3 + a^+_4 a^+_4)|0\rangle$ $|\Phi+\rangle = 1/\sqrt{2}(a^+_{A0}a^+_{B0} + a^+_{A1}a^+_{B1})|0\rangle \rightarrow i/2\sqrt{2}(a^+_1 a^+_1 + a^+_2 a^+_2 + a^+_3 a^+_3 + a^+_4 a^+_4)|0\rangle$ $|\Psi-\rangle = 1/\sqrt{2}(a^+_{A0}a^+_{B1} - a^+_{A1}a^+_{B0})|0\rangle \rightarrow 1/\sqrt{2}(a^+_1 a^+_3 - a^+_2 a^+_4)|0\rangle$ $|\Psi+\rangle = 1/\sqrt{2}(a^+_{A0}a^+_{B1} + a^+_{A1}a^+_{B0})|0\rangle \rightarrow i/\sqrt{2}(a^+_1 a^+_2 + a^+_3 a^+_4)|0\rangle$ The result is the same as in the usual Bell state measurement. If photons are detected simultaneously in {D1 and D3} or {D2 and D4}, we know the Bell state was $|\Psi-\rangle$. If on the other hand photons are detected simultaneously in {D1 and D2} or {D3 and D4}, we know the Bell state was $|\Psi+\rangle$.

If photons are detected solely in D1 or D2 or D3 or D4 (we assume the detectors are not photon-number-resolving), there are several possibilities. Namely, the Bell state may be $-|\Phi-\rangle$, $-|\Phi+\rangle$ or only one photon reached the measurement device. By solely in D1, D2, D3 or D4 it is in this context meant that a detection is made in one and only one of the detectors.

This measurement can be used in MDIQKD allowing the measurement device to be imperfect and untrusted without compromising the security of the transmission. This also allows doubling the length of the QKD transmission.

Figure 2:
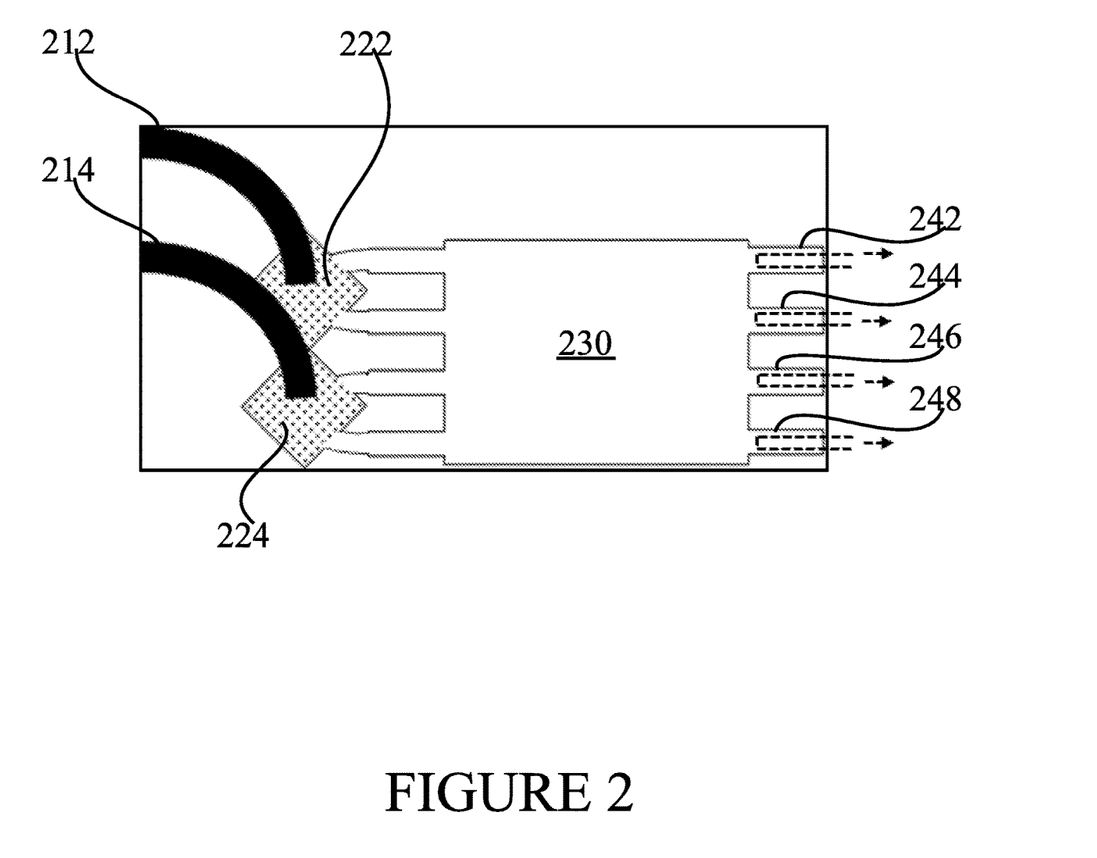
FIG. 2 illustrates a first example implementation of a partial Bell state measurement apparatus.

FIG. 2 illustrates a first example implementation of a partial Bell state measurement apparatus. The illustrated implementation comprises a photonic chip. Optical fibres 212 and 214, which may comprise glass or plastic cores, for example, convey the qubits to the apparatus. Each optic fibre is coupled with a polarization splitting fibre coupler, such that optic fibre 212 is coupled with polarization splitting fibre coupler 222 and optic fibre 214 is coupled with polarization splitting fibre coupler 224. Each fibre may be coupled perpendicular to the photonic chip, as schematically illustrated in the figure. The polarization splitting fibre couplers may be configured to perform as PBSRs discussed in connection with FIG. 1B.

Each polarization splitting fibre coupler coupling the optic fibres to the photonic chip may comprise a two-dimensional grating configured to separate incoming light according to its polarization and direct it in two perpendicular directions, each of these directions being perpendicular to the input optic fibre. Consequently, polarizations of both outputs are identical and in-plane with the photonic chip.

The outputs of polarization splitting fibre couplers 222 and 224 contain first four optical modes. The first four optical modes are conveyed into 4×4 MMI 230, which is configured to perform interferometric operations as described above, to thereby generate second four optical modes as output. Each of the second four optical modes is provided to a detector. Detectors 242, 244, 246 and 248 are couples with outputs of 4×4 MMI 230.

Detectors 242, 244, 246 and 248 may be implemented, for example, as superconducting nanowire single photon detectors, SNSPDs, directly deposited on silicon waveguides. Alternatively, these detectors may comprise conventional photon detectors. The determination of Bell state may be performed based on which two of the four detectors detect photons simultaneously, as described above.

Figure 3:
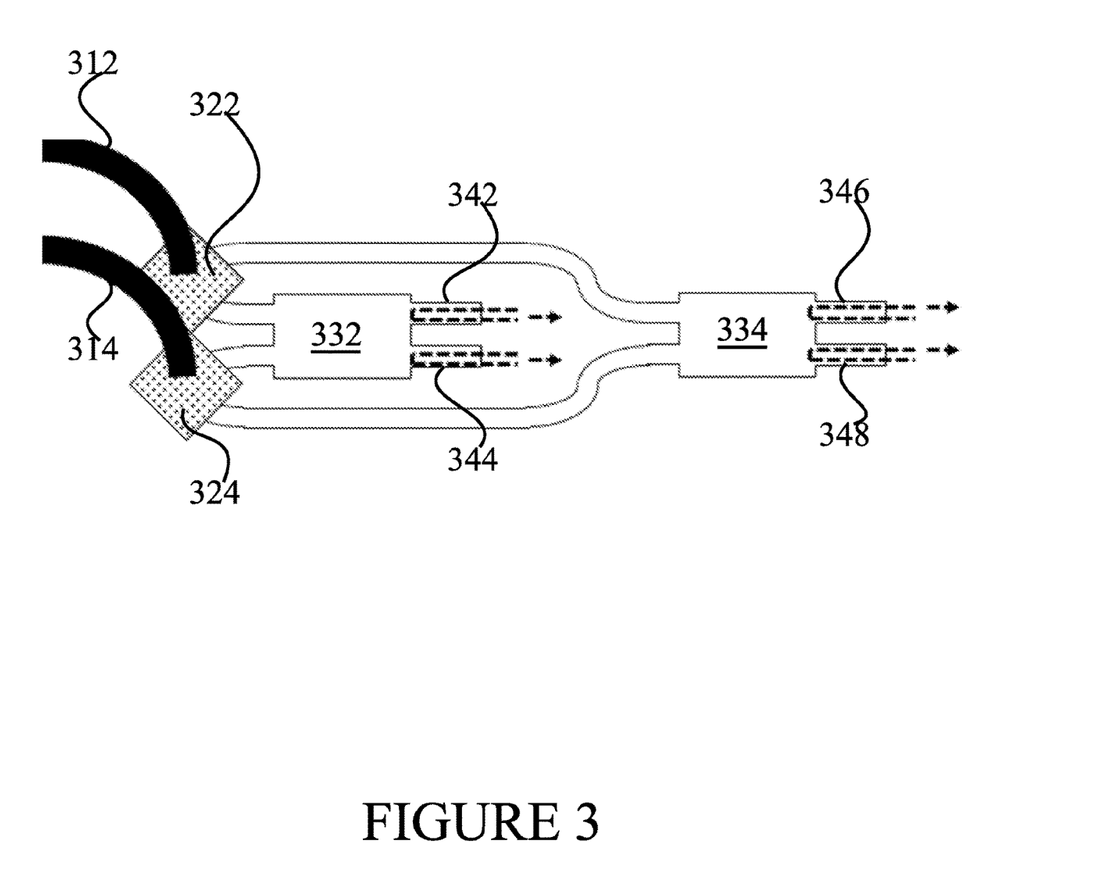
FIG. 3 illustrates a second example implementation of a partial Bell state measurement apparatus.

FIG. 3 illustrates a second example implementation of a partial Bell state measurement apparatus. The illustrated implementation comprises a photonic chip.

Optical fibres 312 and 314, which may comprise glass or plastic cores, for example, convey the qubits to the apparatus. Each optic fibre is coupled with a polarization splitting fibre coupler, such that optic fibre 312 is coupled with polarization splitting fibre coupler 322 and optic fibre 314 is coupled with polarization splitting fibre coupler 324. Each fibre may be coupled perpendicular to the photonic chip, as schematically illustrated in the figure.

Each polarization splitting fibre coupler coupling the optic fibres to the photonic chip may comprise a two-dimensional grating configured to separate incoming light according to its polarization and direct it in two perpendicular directions, each of these directions being perpendicular to the input optic fibre. Consequently, polarizations of both outputs are identical and in-plane with the photonic chip.

The outputs of polarization splitting fibre couplers 322 and 324 contain first four optical modes. In detail, in the implementation of FIG. 3, polarization splitting fibre coupler 322 is coupled to provide a first one of the first four optical modes to 2×2 MMI 324, and a second one of the first four optical modes to 2×2 MMI 332. Polarization splitting fibre coupler 324 is coupled to provide a third one of the first four optical modes to 2×2 MMI 322, and a fourth one of the first four optical modes to 2×2 MMI 334.

2×2 MMI 332 and 2×2 MMI 334 are configured to provide as outputs the second four optical modes. In detail, 2×2 MMI 332 is configured to provide a first one of the second four optical modes to detector 342, and a second one of the second four optical modes to detector 344. Likewise, 2×2 MMI 334 is configured to provide a third one of the second four optical modes to detector 346, and a fourth one of the second four optical modes to detector 348. Detectors 342, 344, 346 and 348 may comprise SNSPDs or conventional photon detectors, for example. In the FIG. 3 embodiment, each 2×2 MMI element is arranged to provide its output to no more than two detectors from among the four detectors. The determination of Bell state may be performed based on which two of the four detectors detect photons simultaneously, as described above. In detail, each 2×2 MMI element is arranged to provide its output to exactly two detectors from among the four detectors.

Figure 4:
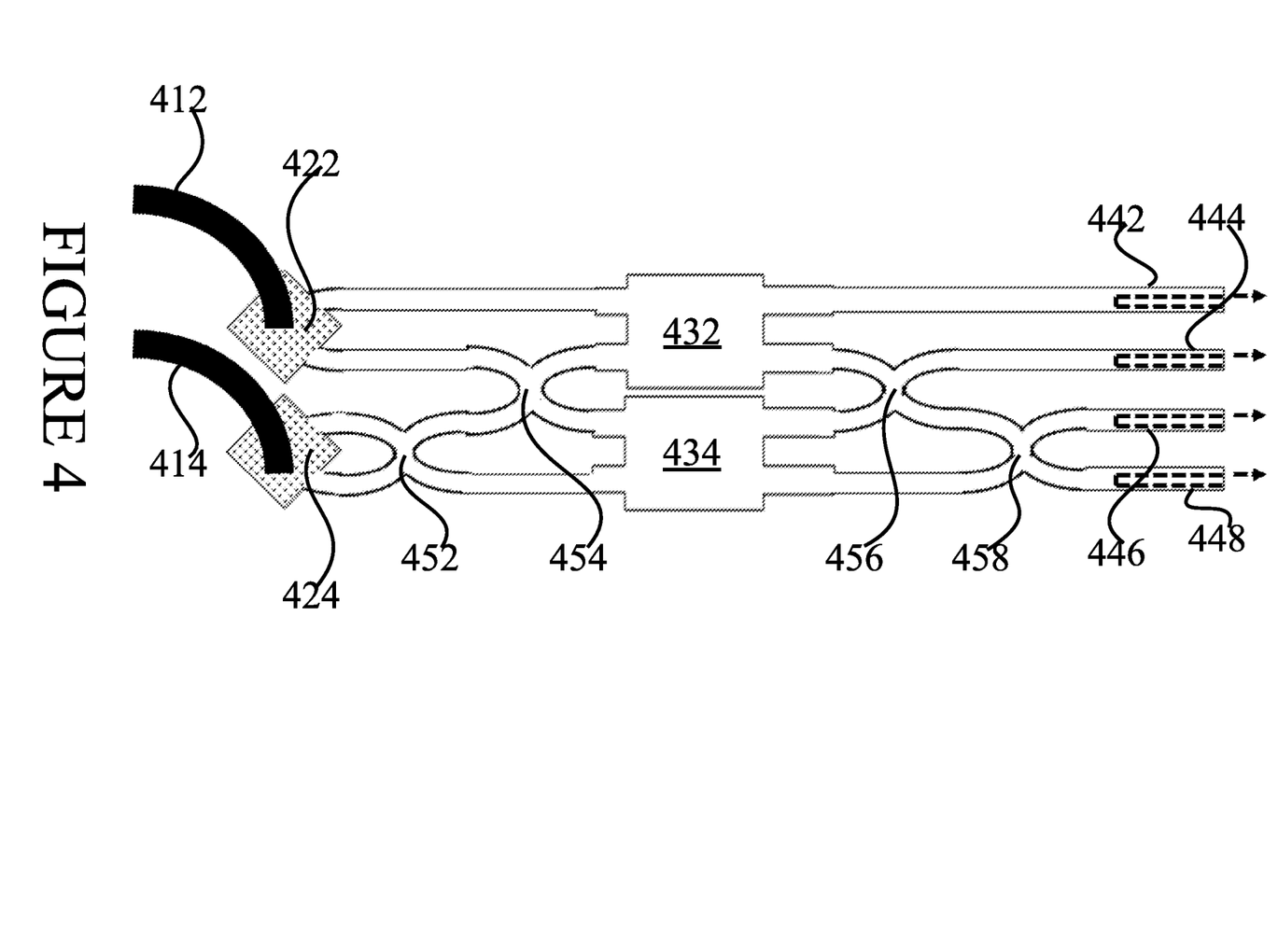
FIG. 4 illustrates a third example implementation of a partial Bell state measurement apparatus.

FIG. 4 illustrates a third example implementation of a partial Bell state measurement apparatus. The illustrated implementation comprises a photonic chip. In the embodiment of FIG. 4, waveguide crossings are arranged between the polarization splitting fibre couplers and the 2×2 MMI elements, and between the 2×2 MMI elements and the detectors.

Optical fibres 412 and 414, which may comprise glass or plastic cores, for example, convey the qubits to the apparatus. Each optic fibre is coupled with a polarization splitting fibre coupler, such that optic fibre 412 is coupled with polarization splitting fibre coupler 422 and optic fibre 414 is coupled with polarization splitting fibre coupler 424. Each fibre may be coupled perpendicular to the photonic chip, as schematically illustrated in the figure. The polarization splitting fibre couplers may be configured to perform as PBSRs discussed in connection with FIG. 1B.

Each polarization splitting fibre coupler coupling the optic fibres to the photonic chip may comprise a two-dimensional grating configured to separate incoming light according to its polarization and direct it in two perpendicular directions, each of these directions being perpendicular to the input optic fibre. Consequently, polarizations of both outputs are identical and in-plane with the photonic chip.

The outputs of polarization splitting fibre couplers 422 and 424 contain first four optical modes. In detail, polarization splitting fibre coupler 422 provides a first one of the first four optical modes to 2×2 MMI 432, and a second one of the first four optical modes toward 2×2 MMI 432 and to 2×2 MMI 434, via waveguide crossing 454. Polarization splitting fibre coupler 424 provides a third one and a fourth one of the first four optical modes toward 2×2 MMI 432 and 2×2 MMI 434, via waveguide crossings 452 and 454, as illustrated in FIG. 4.

2×2 MMI 432 and 2×2 MMI 434 are configured to provide as outputs the second four optical modes. In detail, 2×2 MMI 432 is configured to provide a first one of the second four optical modes to detector 442, and a second one of the second four optical modes toward detectors 444, 446 and 448, via waveguide crossings 456 and 458, as illustrated in FIG. 4. Likewise, 2×2 MMI 434 is configured to provide a third one of the second four optical modes toward detectors 444, 446 and 448, and a fourth one of the second four optical modes toward detectors 446 and 448, via waveguide crossing 458. Detectors 442, 444, 446 and 448 may comprise SNSPDs or conventional photon detectors, for example.

In the FIG. 4 embodiment, each 2×2 MMI element is arranged to provide its output to at least three detectors from among the four detectors. In detail, a first one of the 2×2 MMI elements is configured to influence the inputs of four of the four detectors, and a second one of the 2×2 MMI elements is configured to influence the inputs of three of the four detectors. The determination of Bell state may be performed based on which two of the four detectors detect photons simultaneously, as described above. An advantage of the FIG. 4 arrangement is that detectors 442, 444, 446 and 448 may be aligned along the same facet of the chip. This may be useful where several apparatuses such as the one illustrated in FIG. 4 are integrated together.

Figure 5:
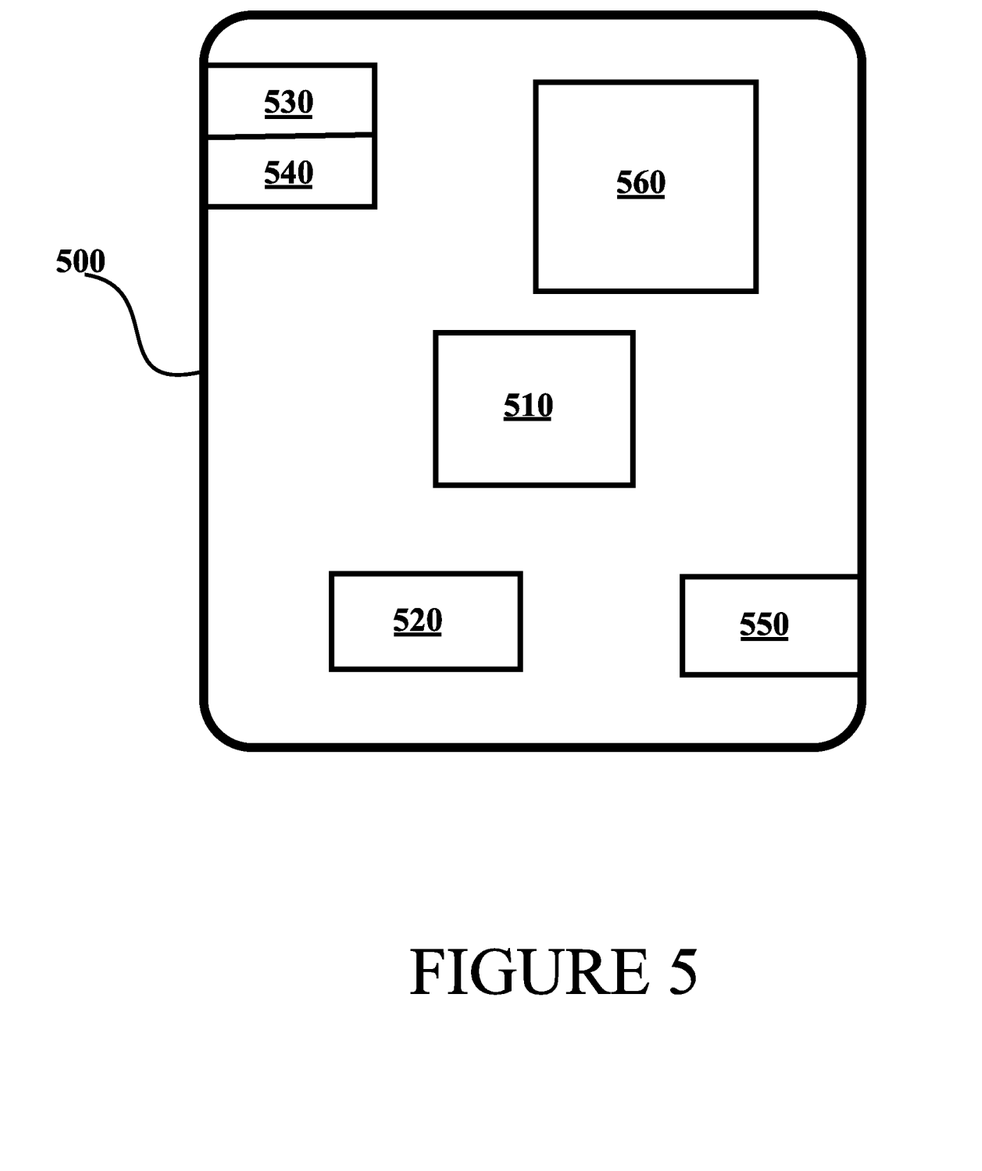
FIG. 5 illustrates an example apparatus capable of supporting at least some embodiments of the present invention.

Overall, as may be seen from FIGS. 3, 4 and 5, an interferometer stage comprising at least one interferometer may be employed to obtain the second four optical modes from the first four optical modes.

FIG. 5 illustrates an example apparatus capable of supporting at least some embodiments of the present invention. Illustrated is device 500, which may comprise, for example, an optical receiver as described herein above. Comprised in device 500 is processor 510, which may comprise, for example, a single- or multi-core processor wherein a single-core processor comprises one processing core and a multi-core processor comprises more than one processing core. Processor 510 may comprise more than one processor. A processing core may comprise, for example, a Cortex-A8 processing core manufactured by ARM Holdings or a Steamroller processing core produced by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with Ethernet, global system for mobile communication, GSM, wideband code division multiple access, WCDMA, long term evolution, LTE, IS-95, wireless local area network, WLAN, and/or worldwide interoperability for microwave access, WiMAX, standards, for example.

Device 500 may comprise an optical receiver 550. Optical receiver 550 may be arranged as described herein with respect to FIG. 1B, FIG. 2, FIG. 3 and/or FIG. 4, for example.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to manage optical communication, such as encryption key distribution.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500.

Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. Processor 510, memory 520, transmitter 530, receiver 540, optical receiver 550 and/or UI 560 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
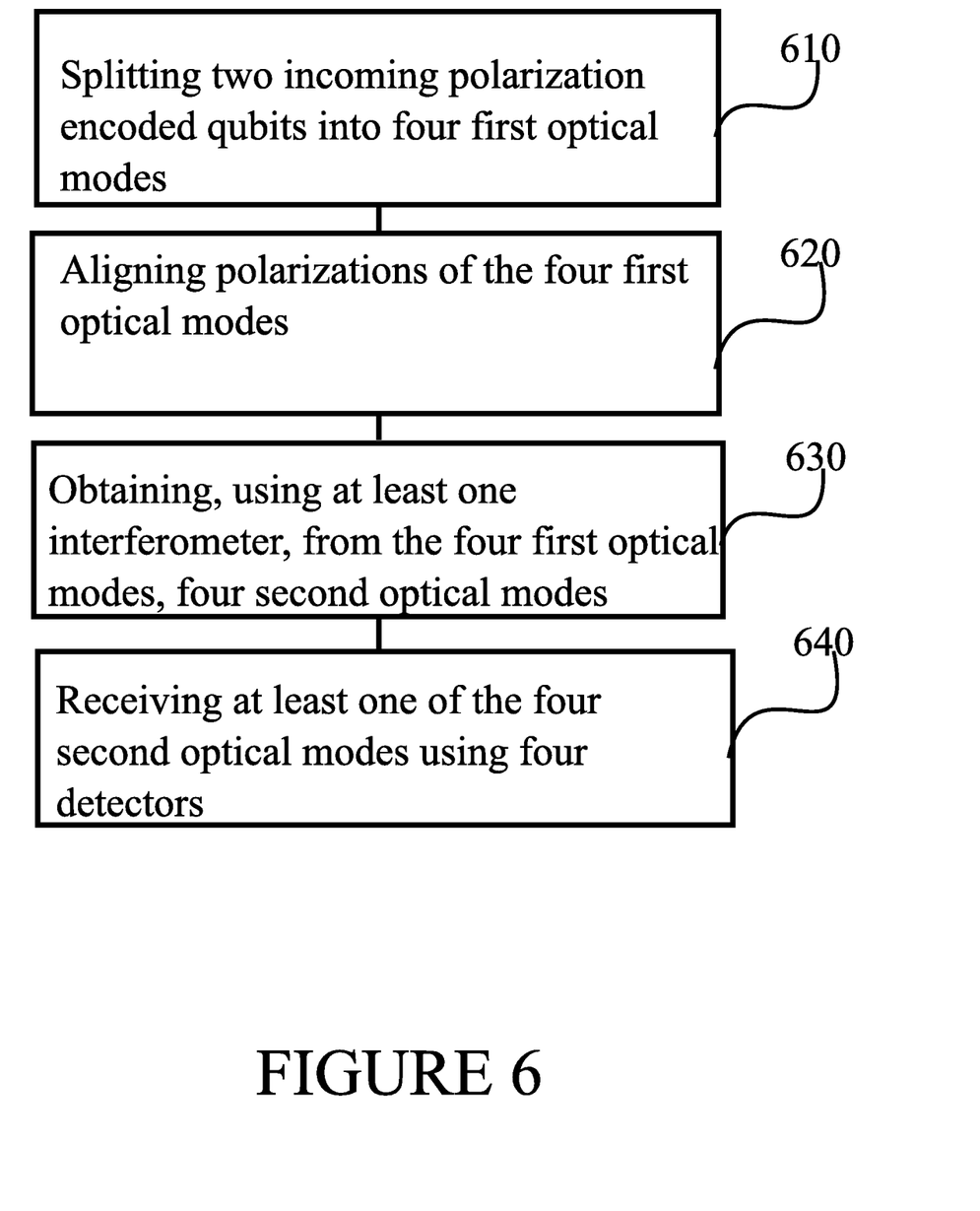
FIG. 6 is a flow graph of a method in accordance with at least some embodiments of the present invention.

FIG. 6 is a flow graph of a method in accordance with at least some embodiments of the present invention. The phases of the illustrated method may be performed in device 110, an auxiliary device or a personal computer, for example, or in a control device configured to control the functioning thereof, when implanted therein.

Phase 610 comprises splitting two incoming polarization encoded qubits into four first optical modes. Phase 620 comprises aligning polarizations of the four first optical modes. Phase 630 comprises obtaining, from the four first optical modes, four second optical modes. Finally, phase 640 comprises receiving at least one of the four second optical modes using four detectors.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optical communication.

Acronyms List

MDI-QKD Measurement device independent QKD
MMI Multimode interferometer
PBSR Polarization beam splitter-rotator
SNSPD Superconducting nanowire single photon detector
QKD Quantum key distribution

REFERENCE SIGNS LIST

| | |
|---|---|
| 110 | polarization-independent beam splitter |
| 120, 122 | polarizing beam splitters |
| 130, 160 | detector D1, D2, D3 and D4 |
| 140, 142 | polarization beam splitter-rotators |
| 150 | interferometer |
| 212, 214, 312, 314, 412, 414 | optic fibres |
| 222, 223, 322, 324, 422, 424 | polarization splitting fibre couplers |
| 230 | 4 × 4 MMI |
| 242, 244, 246, 248, 342, 344, 346, 348, 442, 444, 446, 448 | detectors |
| 332, 334, 432, 434 | 2 × 2 MMIs |
| 452, 454, 456, 458 | waveguide crossings (FIG. 4) |
| 510-560 | Structure of the apparatus of FIG. 5 |
| 610-640 | Phases of the method of FIG. 6 |

The invention claimed is:

1. An apparatus comprising:
   a first and a second polarization beam splitter-rotator, the first and the second polarization beam splitter-rotator being arranged to split two incoming polarization encoded qubits into four first optical modes, the apparatus being configured to align polarizations of the four first optical modes;
   an interferometer stage configured to obtain, from the four first optical modes, four second optical modes, and
   four detectors arranged to receive at least one of the four second optical modes.

2. The apparatus according to claim 1, wherein the first polarization beam splitter-rotator is arranged to receive a first one of the two incoming polarization encoded qubits and split it into two first optical modes, and the second polarization beam splitter-rotator is arranged to receive a second one of the two incoming polarization encoded qubits and split it into two further first optical modes.

3. The apparatus according to claim 1, wherein the apparatus further comprises at least one processing core configured to determine, when photons are detected in the four detectors and to determine a Bell state of the incoming two polarization encoded qubits based on when the photons are detected.

4. The apparatus according to claim 3, wherein the at least one processing core is configured to determine a first Bell state responsive to photons being detected in a first and third one, or a second and fourth one, of the four detectors simultaneously, and the at least one processing core is configured to determine a second Bell state responsive to photons being detected in the first and the second one, or the third and the fourth one, of the four detectors simultaneously.

5. The apparatus according to claim 3, wherein the at least one processing core is configured to determine, responsive to photon detection in only one of the four detectors, one of the following:
   a third Bell state, a fourth Bell state, and only one qubit reached the apparatus.

6. The apparatus according to claim 1, wherein the interferometer stage comprises a double length 4×4 multimode interferometer.

7. The apparatus according to claim 1, wherein the interferometer stage comprises two 2×2 multimode interferometer elements, each 2×2 multimode interferometer element being arranged to provide its output to no more than two detectors from among the four detectors.

8. The apparatus according to claim 1, wherein the interferometer stage comprises two 2×2 multimode interferometer elements, each 2×2 multimode interferometer element being arranged to provide its output to at least three detectors from among the four detectors.

9. The apparatus according to claim 1, wherein the four detectors comprise four superconducting nanowire single photon detectors.

10. The apparatus according to claim 1, wherein the apparatus is integrated on an integrated photonic chip.

11. A method comprising:
    splitting, in an apparatus, two incoming polarization encoded qubits into four first optical modes by a first and a second polarization beam splitter-rotator;
    aligning, in the apparatus, polarizations of the four first optical modes;
    obtaining, in the apparatus, using an at least one interferometer, from the four first optical modes, four second optical modes, and
    receiving, in the apparatus, at least one of the four second optical modes using four detectors.

12. The method according to claim 11, wherein the first polarization beam splitter-rotator receives a first one of the two incoming polarization encoded qubits and splits it into two first optical modes, and the second polarization beam splitter-rotator receives a second one of the two incoming polarization encoded qubits and splits it into two further first optical modes.

13. The method according to claim 11, further comprising determining, when photons of the four second optical modes are received in at least one of the four detectors, and determining a Bell state of the incoming two polarization encoded qubits based on when the photons are received.

14. The method according to claim 13, further comprising determining a first Bell state responsive to photons being detected in a first and third one, or a second and fourth one, of the four detectors simultaneously, and determining a second Bell state responsive to photons being detected in the first and the second one, or the third and the fourth one, of the four detectors simultaneously.

15. The method according to claim 13, further comprising determining, responsive to photon detection in only one of the four detectors, one of the following: a third Bell state, a fourth Bell state, and only one qubit reached the apparatus.

16. The method according to claim 11, wherein the at least one interferometer comprises a double length 4×4 multimode interferometer.

17. The method according to claim 11, wherein the at least one interferometer comprises two 2×2 multimode interferometer elements, each 2×2 multimode interferometer element being arranged to provide its output to no more than two detectors from among the four detectors.

18. The method according to claim 11, wherein the at least one interferometer comprises two 2×2 multimode interferometer elements, each 2×2 multimode interferometer element being arranged to provide its output to at least three detectors from among the four detectors.

19. The method according to claim 11, wherein the four detectors comprise four superconducting nanowire single photon detectors.

20. A non-transitory computer readable medium having stored thereon a set of computer readable instructions that, when executed by at least one processor, cause an apparatus to at least:
    split two incoming polarization encoded qubits into four first optical modes by a first and a second polarization beam splitter-rotator;
    align polarizations of the four first optical modes;
    obtain, using at least one interferometer, from the four first optical modes, four second optical modes, and
    receive at least one of the four second optical modes using four detectors.

* * * * *